(12) United States Patent
Steinberg et al.

(10) Patent No.: US 8,233,674 B2
(45) Date of Patent: **\*Jul. 31, 2012**

(54) RED EYE FALSE POSITIVE FILTERING USING FACE LOCATION AND ORIENTATION

(75) Inventors: Eran Steinberg, San Francisco, CA (US); Alexandru Drimbarean, Galway (IE); Florin Nanu, Bucuresti (RO)

(73) Assignee: DigitalOptics Corporation Europe Limited, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/113,913

(22) Filed: May 23, 2011

(65) Prior Publication Data

US 2011/0222730 A1    Sep. 15, 2011

Related U.S. Application Data

(63) Continuation of application No. 12/043,025, filed on Mar. 5, 2008, now Pat. No. 7,995,804.

(60) Provisional application No. 60/892,882, filed on Mar. 5, 2007.

(51) Int. Cl.
*G06K 9/00* (2006.01)

(52) U.S. Cl. ........ 382/117; 382/118; 382/115; 382/128; 382/130; 382/103; 382/275; 382/260; 382/274; 358/515; 358/518

(58) Field of Classification Search .................. 382/117, 382/118, 115, 128, 130, 103, 275, 260, 274; 358/515, 518
See application file for complete search history.

(56) References Cited

U.S. PATENT DOCUMENTS

| 4,285,588 A | 8/1981 | Mir |
| 4,577,219 A | 3/1986 | Klie et al. |
| 4,646,134 A | 2/1987 | Komatsu et al. |
| 4,777,620 A | 10/1988 | Shimoni et al. |
| 4,881,067 A | 11/1989 | Watanabe et al. |
| 4,978,989 A | 12/1990 | Nakano et al. |
| 5,016,107 A | 5/1991 | Sasson et al. |

(Continued)

FOREIGN PATENT DOCUMENTS

EP    884694 A1    12/1998

(Continued)

OTHER PUBLICATIONS

Agrawal A. et al., "Removing photography artifacts using gradient projection and flash-exposure sampling" ACM Transactions on Graphics, 2005, pp. 828-835.

(Continued)

*Primary Examiner* — Mike Rahmjoo
(74) *Attorney, Agent, or Firm* — Andrew V. Smith

(57) ABSTRACT

An image is acquired including a red eye defect and non red eye defect regions having a red color. An initial segmentation of candidate redeye regions is performed. A location and orientation of one or more faces within the image are determined. The candidate redeye regions are analyzed based on the determined location and orientation of the one or more faces to determine a probability that each redeye region appears at a position of an eye. Any confirmed redeye regions having at least a certain threshold probability of being a false positive are removed as candidate redeye defect regions. The remaining redeye defect regions are corrected and a red eye corrected image is generated.

17 Claims, 4 Drawing Sheets
(2 of 4 Drawing Sheet(s) Filed in Color)

U.S. PATENT DOCUMENTS

| | | | |
|---|---|---|---|
| 5,070,355 A | 12/1991 | Inoue et al. |
| 5,130,789 A | 7/1992 | Dobbs et al. |
| 5,164,831 A | 11/1992 | Kuchta et al. |
| 5,164,833 A | 11/1992 | Aoki |
| 5,202,720 A | 4/1993 | Fujino et al. |
| 5,231,674 A | 7/1993 | Cleveland et al. |
| 5,249,053 A | 9/1993 | Jain |
| 5,274,457 A | 12/1993 | Kobayashi et al. |
| 5,301,026 A | 4/1994 | Lee |
| 5,303,049 A | 4/1994 | Ejima et al. |
| 5,335,072 A | 8/1994 | Tanaka et al. |
| 5,384,601 A | 1/1995 | Yamashita et al. |
| 5,400,113 A | 3/1995 | Sosa et al. |
| 5,426,478 A | 6/1995 | Katagiri et al. |
| 5,432,863 A | 7/1995 | Benati et al. |
| 5,432,866 A | 7/1995 | Sakamoto |
| 5,452,048 A | 9/1995 | Edgar |
| 5,455,606 A | 10/1995 | Keeling et al. |
| 5,537,516 A | 7/1996 | Sherman et al. |
| 5,568,187 A | 10/1996 | Okino |
| 5,568,194 A | 10/1996 | Abe |
| 5,649,238 A | 7/1997 | Wakabayashi et al. |
| 5,671,013 A | 9/1997 | Nakao |
| 5,678,073 A | 10/1997 | Stephenson, III et al. |
| 5,694,926 A | 12/1997 | DeVries et al. |
| 5,708,866 A | 1/1998 | Leonard |
| 5,719,639 A | 2/1998 | Imamura |
| 5,719,951 A | 2/1998 | Shackleton et al. |
| 5,724,456 A | 3/1998 | Boyack et al. |
| 5,734,425 A | 3/1998 | Takizawa et al. |
| 5,748,764 A | 5/1998 | Benati et al. |
| 5,748,784 A | 5/1998 | Sugiyama |
| 5,751,836 A | 5/1998 | Wildes et al. |
| 5,761,550 A | 6/1998 | Kancigor |
| 5,781,650 A | 7/1998 | Lobo et al. |
| 5,805,720 A | 9/1998 | Suenaga et al. |
| 5,805,727 A | 9/1998 | Nakano |
| 5,805,745 A | 9/1998 | Graf |
| 5,815,749 A | 9/1998 | Tsukahara et al. |
| 5,818,975 A | 10/1998 | Goodwin et al. |
| 5,847,714 A | 12/1998 | Naqvi et al. |
| 5,850,470 A | 12/1998 | Kung et al. |
| 5,862,217 A | 1/1999 | Steinberg et al. |
| 5,862,218 A | 1/1999 | Steinberg |
| 5,892,837 A | 4/1999 | Luo et al. |
| 5,949,904 A | 9/1999 | Delp |
| 5,974,189 A | 10/1999 | Nicponski |
| 5,990,973 A | 11/1999 | Sakamoto |
| 5,991,456 A | 11/1999 | Rahman et al. |
| 5,991,549 A | 11/1999 | Tsuchida |
| 5,991,594 A | 11/1999 | Froeber et al. |
| 5,999,160 A | 12/1999 | Kitamura et al. |
| 6,006,039 A | 12/1999 | Steinberg et al. |
| 6,009,209 A | 12/1999 | Acker et al. |
| 6,011,547 A | 1/2000 | Shiota et al. |
| 6,016,354 A | 1/2000 | Lin et al. |
| 6,028,611 A | 2/2000 | Anderson et al. |
| 6,035,072 A | 3/2000 | Read |
| 6,035,074 A | 3/2000 | Fujimoto et al. |
| 6,036,072 A | 3/2000 | Lee |
| 6,101,271 A | 8/2000 | Yamashita et al. |
| 6,104,839 A | 8/2000 | Cok et al. |
| 6,118,485 A | 9/2000 | Hinoue et al. |
| 6,125,213 A | 9/2000 | Morimoto |
| 6,134,339 A | 10/2000 | Luo |
| 6,151,403 A | 11/2000 | Luo |
| 6,172,706 B1 | 1/2001 | Tatsumi |
| 6,192,149 B1 | 2/2001 | Eschbach et al. |
| 6,195,127 B1 | 2/2001 | Sugimoto |
| 6,201,571 B1 | 3/2001 | Ota |
| 6,204,858 B1 | 3/2001 | Gupta |
| 6,233,364 B1 | 5/2001 | Krainiouk et al. |
| 6,249,315 B1 | 6/2001 | Holm |
| 6,252,976 B1 | 6/2001 | Schildkraut et al. |
| 6,266,054 B1 | 7/2001 | Lawton et al. |
| 6,268,939 B1 | 7/2001 | Klassen et al. |
| 6,275,614 B1 | 8/2001 | Krishnamurthy et al. |
| 6,278,491 B1 | 8/2001 | Wang et al. |
| 6,285,410 B1 | 9/2001 | Marni |
| 6,292,574 B1 | 9/2001 | Schildkraut et al. |
| 6,295,378 B1 | 9/2001 | Kitakado et al. |
| 6,298,166 B1 | 10/2001 | Ratnakar et al. |
| 6,300,935 B1 | 10/2001 | Sobel et al. |
| 6,381,345 B1 | 4/2002 | Swain |
| 6,393,148 B1 | 5/2002 | Bhaskar |
| 6,396,963 B2 | 5/2002 | Shaffer et al. |
| 6,407,777 B1 | 6/2002 | DeLuca |
| 6,421,468 B1 | 7/2002 | Ratnakar et al. |
| 6,426,775 B1 | 7/2002 | Kurokawa |
| 6,429,924 B1 | 8/2002 | Milch |
| 6,433,818 B1 | 8/2002 | Steinberg et al. |
| 6,438,264 B1 | 8/2002 | Gallagher et al. |
| 6,441,854 B2 | 8/2002 | Fellegara et al. |
| 6,459,436 B1 | 10/2002 | Kumada et al. |
| 6,473,199 B1 | 10/2002 | Gilman et al. |
| 6,496,655 B1 | 12/2002 | Malloy Desormeaux |
| 6,501,911 B1 | 12/2002 | Malloy Desormeaux |
| 6,505,003 B1 | 1/2003 | Malloy Desormeaux |
| 6,510,520 B1 | 1/2003 | Steinberg |
| 6,516,154 B1 | 2/2003 | Parulski et al. |
| 6,614,471 B1 | 9/2003 | Ott |
| 6,614,995 B2 | 9/2003 | Tseng |
| 6,621,867 B1 | 9/2003 | Sazzad et al. |
| 6,628,833 B1 | 9/2003 | Horie |
| 6,631,208 B1 | 10/2003 | Kinjo et al. |
| 6,700,614 B1 | 3/2004 | Hata |
| 6,707,950 B1 | 3/2004 | Burns et al. |
| 6,714,665 B1 | 3/2004 | Hanna et al. |
| 6,718,051 B1 | 4/2004 | Eschbach |
| 6,724,941 B1 | 4/2004 | Aoyama |
| 6,728,401 B1 | 4/2004 | Hardeberg |
| 6,734,911 B1 | 5/2004 | Lyons |
| 6,765,686 B2 | 7/2004 | Maruoka |
| 6,786,655 B2 | 9/2004 | Cook et al. |
| 6,792,161 B1 | 9/2004 | Imaizumi et al. |
| 6,798,913 B2 | 9/2004 | Toriyama |
| 6,859,565 B2 | 2/2005 | Baron |
| 6,873,743 B2 | 3/2005 | Steinberg |
| 6,885,766 B2 | 4/2005 | Held et al. |
| 6,895,112 B2 | 5/2005 | Chen et al. |
| 6,900,882 B2 | 5/2005 | Iida |
| 6,912,298 B1 | 6/2005 | Wilensky |
| 6,937,997 B1 | 8/2005 | Parulski |
| 6,967,680 B1 | 11/2005 | Kagle et al. |
| 6,980,691 B2 | 12/2005 | Nesterov et al. |
| 6,984,039 B2 | 1/2006 | Agostinelli |
| 7,024,051 B2 | 4/2006 | Miller et al. |
| 7,027,643 B2 | 4/2006 | Comaniciu et al. |
| 7,027,662 B2 | 4/2006 | Baron |
| 7,030,927 B2 | 4/2006 | Sasaki |
| 7,035,461 B2 | 4/2006 | Luo et al. |
| 7,035,462 B2 | 4/2006 | White et al. |
| 7,042,501 B1 | 5/2006 | Matama |
| 7,042,505 B1 | 5/2006 | DeLuca |
| 7,062,086 B2 | 6/2006 | Chen et al. |
| 7,116,820 B2 | 10/2006 | Luo et al. |
| 7,130,453 B2 | 10/2006 | Kondo et al. |
| 7,133,070 B2 | 11/2006 | Wheeler et al. |
| 7,155,058 B2 | 12/2006 | Gaubatz et al. |
| 7,171,044 B2 | 1/2007 | Chen et al. |
| 7,216,289 B2 | 5/2007 | Kagle et al. |
| 7,224,850 B2 | 5/2007 | Zhang et al. |
| 7,289,664 B2 | 10/2007 | Enomoto |
| 7,295,233 B2 | 11/2007 | Steinberg et al. |
| 7,310,443 B1 | 12/2007 | Kris et al. |
| 7,315,631 B1 | 1/2008 | Corcoran et al. |
| 7,336,821 B2 | 2/2008 | Ciuc et al. |
| 7,352,394 B1 | 4/2008 | DeLuca et al. |
| 7,362,368 B2 | 4/2008 | Steinberg et al. |
| 7,369,712 B2 | 5/2008 | Steinberg et al. |
| 7,403,643 B2 | 7/2008 | Ianculescu et al. |
| 7,436,998 B2 | 10/2008 | Steinberg et al. |
| 7,454,040 B2 | 11/2008 | Luo et al. |
| 7,515,740 B2 | 4/2009 | Corcoran et al. |
| 7,567,707 B2 | 7/2009 | Willamowski et al. |
| 7,574,069 B2 | 8/2009 | Setlur et al. |
| 7,593,603 B1 | 9/2009 | Wilensky |

| | | |
|---|---|---|
| 7,613,332 B2 | 11/2009 | Enomoto et al. |
| 7,630,006 B2 | 12/2009 | DeLuca et al. |
| 7,652,695 B2 | 1/2010 | Halpern |
| 7,657,060 B2 | 2/2010 | Cohen et al. |
| 7,689,009 B2 | 3/2010 | Corcoran et al. |
| 7,702,149 B2 | 4/2010 | Ohkubo et al. |
| 7,705,891 B2 | 4/2010 | Silverbrook |
| 7,738,015 B2 | 6/2010 | Steinberg et al. |
| 7,747,071 B2 | 6/2010 | Yen et al. |
| 7,747,160 B2 | 6/2010 | Thorn |
| 7,819,525 B2 | 10/2010 | Connell, II |
| 7,907,786 B2 | 3/2011 | Fan et al. |
| 7,920,723 B2 | 4/2011 | Nanu et al. |
| 7,925,060 B2 | 4/2011 | Norita et al. |
| 7,970,180 B2 * | 6/2011 | Akahori ............ 382/117 |
| 7,995,804 B2 | 8/2011 | Steinberg et al. |
| 2001/0015760 A1 | 8/2001 | Fellegara et al. |
| 2001/0031142 A1 | 10/2001 | Whiteside |
| 2001/0052937 A1 | 12/2001 | Suzuki |
| 2002/0019859 A1 | 2/2002 | Watanabe |
| 2002/0041329 A1 | 4/2002 | Steinberg |
| 2002/0051571 A1 | 5/2002 | Jackway et al. |
| 2002/0054224 A1 | 5/2002 | Wasula et al. |
| 2002/0085088 A1 | 7/2002 | Eubanks |
| 2002/0089514 A1 | 7/2002 | Kitahara et al. |
| 2002/0090133 A1 | 7/2002 | Kim et al. |
| 2002/0093577 A1 | 7/2002 | Kitawaki et al. |
| 2002/0093633 A1 | 7/2002 | Milch |
| 2002/0105662 A1 | 8/2002 | Patton et al. |
| 2002/0114513 A1 | 8/2002 | Hirao |
| 2002/0126893 A1 | 9/2002 | Held et al. |
| 2002/0131770 A1 | 9/2002 | Meier et al. |
| 2002/0136450 A1 | 9/2002 | Chen et al. |
| 2002/0141770 A1 | 9/2002 | Meier et al. |
| 2002/0141661 A1 | 10/2002 | Steinberg |
| 2002/0150292 A1 | 10/2002 | O'callaghan |
| 2002/0150306 A1 | 10/2002 | Baron |
| 2002/0159630 A1 | 10/2002 | Buzuloiu et al. |
| 2002/0172419 A1 | 11/2002 | Lin et al. |
| 2002/0176623 A1 | 11/2002 | Steinberg |
| 2003/0007687 A1 | 1/2003 | Nesterov et al. |
| 2003/0021478 A1 | 1/2003 | Yoshida |
| 2003/0025808 A1 | 2/2003 | Parulski et al. |
| 2003/0025811 A1 | 2/2003 | Keelan et al. |
| 2003/0039402 A1 | 2/2003 | Robins et al. |
| 2003/0044063 A1 | 3/2003 | Meckes et al. |
| 2003/0044070 A1 | 3/2003 | Fuersich et al. |
| 2003/0044176 A1 | 3/2003 | Saitoh |
| 2003/0044177 A1 | 3/2003 | Oberhardt et al. |
| 2003/0044178 A1 | 3/2003 | Oberhardt et al. |
| 2003/0052991 A1 | 3/2003 | Stavely et al. |
| 2003/0053664 A1 | 3/2003 | Pavlidis et al. |
| 2003/0058343 A1 | 3/2003 | Katayama |
| 2003/0058349 A1 | 3/2003 | Takemoto |
| 2003/0086164 A1 | 5/2003 | Abe |
| 2003/0095197 A1 | 5/2003 | Wheeler et al. |
| 2003/0107649 A1 | 6/2003 | Flickner et al. |
| 2003/0113035 A1 | 6/2003 | Cahill et al. |
| 2003/0118216 A1 | 6/2003 | Goldberg |
| 2003/0118217 A1 | 6/2003 | Kondo et al. |
| 2003/0137597 A1 | 7/2003 | Sakamoto et al. |
| 2003/0142285 A1 | 7/2003 | Enomoto |
| 2003/0161506 A1 | 8/2003 | Velazquez et al. |
| 2003/0190072 A1 | 10/2003 | Adkins et al. |
| 2003/0194143 A1 | 10/2003 | Iida |
| 2003/0202715 A1 | 10/2003 | Kinjo |
| 2003/0231241 A1 | 12/2003 | Iida |
| 2004/0017481 A1 | 1/2004 | Takasumi et al. |
| 2004/0027593 A1 | 2/2004 | Wilkins |
| 2004/0032512 A1 | 2/2004 | Silverbrook |
| 2004/0032526 A1 | 2/2004 | Silverbrook |
| 2004/0033071 A1 | 2/2004 | Kubo |
| 2004/0037460 A1 | 2/2004 | Luo et al. |
| 2004/0041924 A1 | 3/2004 | White et al. |
| 2004/0046878 A1 | 3/2004 | Jarman |
| 2004/0047491 A1 | 3/2004 | Rydbeck |
| 2004/0056975 A1 | 3/2004 | Hata |
| 2004/0057622 A1 | 3/2004 | Bradski |
| 2004/0057623 A1 | 3/2004 | Schuhrke et al. |
| 2004/0057705 A1 | 3/2004 | Kohno |
| 2004/0057715 A1 | 3/2004 | Tsuchida et al. |
| 2004/0093432 A1 | 5/2004 | Luo et al. |
| 2004/0109614 A1 | 6/2004 | Enomoto et al. |
| 2004/0114796 A1 | 6/2004 | Kaku |
| 2004/0114797 A1 | 6/2004 | Meckes |
| 2004/0114829 A1 | 6/2004 | LeFeuvre et al. |
| 2004/0114904 A1 | 6/2004 | Sun et al. |
| 2004/0119851 A1 | 6/2004 | Kaku |
| 2004/0120598 A1 | 6/2004 | Feng |
| 2004/0125387 A1 | 7/2004 | Nagao et al. |
| 2004/0126086 A1 | 7/2004 | Nakamura et al. |
| 2004/0141657 A1 | 7/2004 | Jarman |
| 2004/0150743 A1 | 8/2004 | Schinner |
| 2004/0160517 A1 | 8/2004 | Iida |
| 2004/0165215 A1 | 8/2004 | Raguet et al. |
| 2004/0170304 A1 | 9/2004 | Haven et al. |
| 2004/0184044 A1 | 9/2004 | Kolb et al. |
| 2004/0184670 A1 | 9/2004 | Jarman et al. |
| 2004/0196292 A1 | 10/2004 | Okamura |
| 2004/0196433 A1 | 10/2004 | Durnell |
| 2004/0196503 A1 | 10/2004 | Kurtenbach et al. |
| 2004/0213476 A1 | 10/2004 | Luo et al. |
| 2004/0223063 A1 | 11/2004 | DeLuca et al. |
| 2004/0227978 A1 | 11/2004 | Enomoto |
| 2004/0228542 A1 | 11/2004 | Zhang et al. |
| 2004/0233299 A1 | 11/2004 | Ioffe et al. |
| 2004/0233301 A1 | 11/2004 | Nakata et al. |
| 2004/0234156 A1 | 11/2004 | Watanabe et al. |
| 2004/0239779 A1 | 12/2004 | Washisu |
| 2004/0240747 A1 | 12/2004 | Jarman et al. |
| 2004/0258308 A1 | 12/2004 | Sadovsky et al. |
| 2005/0001024 A1 | 1/2005 | Kusaka et al. |
| 2005/0013602 A1 | 1/2005 | Ogawa |
| 2005/0013603 A1 | 1/2005 | Ichimasa |
| 2005/0024498 A1 | 2/2005 | Iida et al. |
| 2005/0031224 A1 | 2/2005 | Prilutsky et al. |
| 2005/0041121 A1 | 2/2005 | Steinberg et al. |
| 2005/0046730 A1 | 3/2005 | Li |
| 2005/0047655 A1 | 3/2005 | Luo et al. |
| 2005/0047656 A1 | 3/2005 | Luo et al. |
| 2005/0053279 A1 | 3/2005 | Chen et al. |
| 2005/0058340 A1 | 3/2005 | Chen et al. |
| 2005/0058342 A1 | 3/2005 | Chen et al. |
| 2005/0062856 A1 | 3/2005 | Matsushita |
| 2005/0063083 A1 | 3/2005 | Dart et al. |
| 2005/0068452 A1 | 3/2005 | Steinberg et al. |
| 2005/0074164 A1 | 4/2005 | Yonaha |
| 2005/0074179 A1 | 4/2005 | Wilensky |
| 2005/0078191 A1 | 4/2005 | Battles |
| 2005/0117132 A1 | 6/2005 | Agostinelli |
| 2005/0129331 A1 | 6/2005 | Kakiuchi et al. |
| 2005/0134719 A1 | 6/2005 | Beck |
| 2005/0140801 A1 | 6/2005 | Prilutsky et al. |
| 2005/0147278 A1 | 7/2005 | Rui et al. |
| 2005/0151943 A1 | 7/2005 | Iida |
| 2005/0163498 A1 | 7/2005 | Battles et al. |
| 2005/0168965 A1 | 8/2005 | Yoshida |
| 2005/0196067 A1 | 9/2005 | Gallagher et al. |
| 2005/0199783 A1 | 9/2005 | Wenstrand et al. |
| 2005/0200736 A1 | 9/2005 | Ito |
| 2005/0207649 A1 | 9/2005 | Enomoto et al. |
| 2005/0212955 A1 | 9/2005 | Craig et al. |
| 2005/0219385 A1 | 10/2005 | Terakawa |
| 2005/0219608 A1 | 10/2005 | Wada |
| 2005/0220346 A1 | 10/2005 | Akahori |
| 2005/0220347 A1 | 10/2005 | Enomoto et al. |
| 2005/0226499 A1 | 10/2005 | Terakawa |
| 2005/0232490 A1 | 10/2005 | Itagaki et al. |
| 2005/0238217 A1 | 10/2005 | Enomoto et al. |
| 2005/0238230 A1 | 10/2005 | Yoshida |
| 2005/0243348 A1 | 11/2005 | Yonaha |
| 2005/0275734 A1 | 12/2005 | Ikeda |
| 2005/0276481 A1 | 12/2005 | Enomoto |
| 2005/0280717 A1 | 12/2005 | Sugimoto |
| 2005/0286766 A1 | 12/2005 | Ferman |
| 2006/0008171 A1 | 1/2006 | Petschnigg et al. |
| 2006/0017825 A1 | 1/2006 | Thakur |
| 2006/0038916 A1 | 2/2006 | Knoedgen et al. |

| | | | |
|---|---|---|---|
| 2006/0039690 A1 | 2/2006 | Steinberg et al. | |
| 2006/0045352 A1 | 3/2006 | Gallagher | |
| 2006/0050300 A1 | 3/2006 | Mitani et al. | |
| 2006/0066628 A1 | 3/2006 | Brodie et al. | |
| 2006/0082847 A1 | 4/2006 | Sugimoto | |
| 2006/0093212 A1 | 5/2006 | Steinberg et al. | |
| 2006/0093213 A1 | 5/2006 | Steinberg et al. | |
| 2006/0093238 A1 | 5/2006 | Steinberg et al. | |
| 2006/0098867 A1 | 5/2006 | Gallagher | |
| 2006/0098875 A1 | 5/2006 | Sugimoto | |
| 2006/0119832 A1 | 6/2006 | Iida | |
| 2006/0120599 A1 | 6/2006 | Steinberg et al. | |
| 2006/0126938 A1 | 6/2006 | Lee et al. | |
| 2006/0140455 A1 | 6/2006 | Costache et al. | |
| 2006/0150089 A1 | 7/2006 | Jensen et al. | |
| 2006/0203108 A1 | 9/2006 | Steinberg et al. | |
| 2006/0204052 A1 | 9/2006 | Yokouchi | |
| 2006/0204110 A1 | 9/2006 | Steinberg et al. | |
| 2006/0221408 A1 | 10/2006 | Fukuda | |
| 2006/0257132 A1 | 11/2006 | Shiffer et al. | |
| 2006/0280361 A1 | 12/2006 | Umeda | |
| 2006/0280375 A1* | 12/2006 | Dalton et al. | 382/275 |
| 2006/0285754 A1 | 12/2006 | Steinberg et al. | |
| 2007/0098260 A1 | 5/2007 | Yen et al. | |
| 2007/0110305 A1 | 5/2007 | Corcoran et al. | |
| 2007/0116379 A1 | 5/2007 | Corcoran et al. | |
| 2007/0116380 A1 | 5/2007 | Ciuc et al. | |
| 2007/0133863 A1 | 6/2007 | Sakai et al. | |
| 2007/0150106 A1 | 6/2007 | Hashimoto et al. | |
| 2007/0154189 A1 | 7/2007 | Harradine et al. | |
| 2007/0201724 A1 | 8/2007 | Steinberg et al. | |
| 2007/0263104 A1 | 11/2007 | DeLuca et al. | |
| 2007/0263928 A1 | 11/2007 | Akahori | |
| 2008/0002060 A1 | 1/2008 | DeLuca et al. | |
| 2008/0013798 A1 | 1/2008 | Ionita et al. | |
| 2008/0043121 A1 | 2/2008 | Prilutsky et al. | |
| 2008/0112599 A1 | 5/2008 | Nanu et al. | |
| 2008/0144965 A1 | 6/2008 | Steinberg et al. | |
| 2008/0186389 A1 | 8/2008 | DeLuca et al. | |
| 2008/0199056 A1 | 8/2008 | Tokuse | |
| 2008/0211937 A1 | 9/2008 | Steinberg et al. | |
| 2008/0232711 A1 | 9/2008 | Prilutsky et al. | |
| 2008/0239064 A1 | 10/2008 | Iwasaki | |
| 2008/0240555 A1 | 10/2008 | Nanu et al. | |
| 2009/0041309 A1 | 2/2009 | Kim et al. | |
| 2011/0254981 A1 | 10/2011 | Ito | |
| 2012/0063677 A1 | 3/2012 | Ciuc | |

FOREIGN PATENT DOCUMENTS

| | | |
|---|---|---|
| EP | 911759 A2 | 4/1999 |
| EP | 911759 A3 | 6/2000 |
| EP | 1199672 A2 | 4/2002 |
| EP | 1229486 A1 | 8/2002 |
| EP | 1 296 510 A2 | 3/2003 |
| EP | 1288858 A1 | 3/2003 |
| EP | 1288859 A1 | 3/2003 |
| EP | 1288860 A1 | 3/2003 |
| EP | 1293933 A1 | 3/2003 |
| EP | 1296510 A2 | 3/2003 |
| EP | 1429290 A2 | 6/2004 |
| EP | 1478169 A2 | 11/2004 |
| EP | 1528509 A2 | 5/2005 |
| EP | 979487 B1 | 3/2006 |
| EP | 1429290 B1 | 7/2008 |
| EP | 2 165 523 B1 | 4/2011 |
| GB | 841609 A | 7/1960 |
| JP | 3205989 A2 | 9/1991 |
| JP | 4192681 A2 | 7/1992 |
| JP | 5-224271 A | 9/1993 |
| JP | 5224271 A2 | 9/1993 |
| JP | 7281285 A2 | 10/1995 |
| JP | 9214839 A2 | 8/1997 |
| JP | 11-284874 A | 10/1999 |
| JP | 2000-125320 A | 4/2000 |
| JP | 2000-134486 A2 | 5/2000 |
| JP | 2002-247596 A2 | 8/2002 |
| JP | 2002-271808 A2 | 9/2002 |
| JP | 2003-030647 A2 | 1/2003 |
| WO | WO9802844 A1 | 1/1998 |
| WO | WO9917254 A1 | 4/1999 |
| WO | WO9933684 A2 | 7/1999 |
| WO | WO0171421 A1 | 9/2001 |
| WO | WO0192614 A1 | 12/2001 |
| WO | WO0245003 A1 | 6/2002 |
| WO | WO03019473 A1 | 3/2003 |
| WO | WO03026278 A1 | 3/2003 |
| WO | WO03071484 A1 | 8/2003 |
| WO | WO2004034696 A1 | 4/2004 |
| WO | 2005/015896 A1 | 2/2005 |
| WO | WO2005015896 A1 | 2/2005 |
| WO | WO2005041558 A1 | 5/2005 |
| WO | WO2005076217 A2 | 8/2005 |
| WO | WO2005076217 A3 | 8/2005 |
| WO | WO2005087994 A1 | 9/2005 |
| WO | WO2005109853 A1 | 11/2005 |
| WO | WO2006011635 A1 | 2/2006 |
| WO | WO2006018056 A1 | 2/2006 |
| WO | WO2006045441 A1 | 5/2006 |
| WO | WO2007057063 A1 | 5/2007 |
| WO | WO2007057064 A1 | 5/2007 |
| WO | WO2007093199 A2 | 8/2007 |
| WO | WO2007093199 A3 | 8/2007 |
| WO | WO2007095553 A2 | 8/2007 |
| WO | WO2007095553 A3 | 8/2007 |
| WO | WO2007142621 A1 | 12/2007 |
| WO | WO2008023280 A2 | 2/2008 |
| WO | WO2008109644 A2 | 9/2008 |
| WO | WO2008109644 A3 | 9/2008 |
| WO | 2009/095481 A2 | 8/2009 |
| WO | 2009/095481 A3 | 10/2009 |
| WO | WO2010017953 A1 | 2/2010 |
| WO | WO2010025908 A1 | 3/2010 |

OTHER PUBLICATIONS

Combier, Nathalie et al., "Removal of Defects on Flash Radiographic Images by Fuzzy Combination, Conference: Machine Vision Applications in Industrial Inspection III, http://rlinks2.dialog.com/NASApp/ChannelWEB/DialogProServlet?ChName=engineering", Proceedings of SPIE—The International Society for Optical Engineering, Society of Photo-Optical Instrumentation, 1995, pp. 301-312.

Co-pending U.S. Appl. No. 10/764,339, filed Jan. 22, 2004.

Co-pending U.S. Appl. No. 10/919,226, filed Aug. 16, 2004.

Co-pending U.S. Appl. No. 11/024,046, filed Dec. 27, 2004.

Co-pending U.S. Appl. No. 11/027,001, filed Dec. 29, 2004.

Corcoran, P. et al., "Automated In-Camera Detection of Flash-Eye Defects", IEEE Transactions on Consumer Electronics, 2005, pp. 11-17, vol. 51—Issue 1.

Cucchiara, R. et al., "Detection of Luminosity Profiles of Elongated Shapes", International Conference on Image Processing, 1996, pp. 635-638, vol. 3.

EPO Communication pursuant to Article 94(3) EPC, for European patent application No. 05 707 215.9, report dated Sep. 14, 2010, 11 pages.

Epo Communication pursuant to Article 94(3) EPC, for European Patent Application No. 05 792 584.4, paper dated May 13, 2008, 8 pages.

European Patent Office, Communication pursuant to Article 94(3) EPC for Application No. 04763763.2, dated Mar. 7, 2008, 7 pages.

European Patent Office, Communication pursuant to Article 96(2) EPC for Application No. 04763763.2, dated Aug. 29, 2006, 4 pages.

Final Office Action mailed Apr. 26, 2010, for U.S. Appl. No. 10/773,092, filed Feb. 4, 2004.

Final Office Action mailed Apr. 26, 2010, for U.S. Appl. No. 11/690,834, filed Mar. 25, 2007.

Final Office Action mailed Apr. 26, 2010, for U.S. Appl. No. 11/772,427, filed Feb. 2, 2007.

Final Office Action mailed Apr. 26, 2010, for U.S. Appl. No. 12/035,416, filed Feb. 21, 2008.

Final Office Action mailed Feb. 1, 2011, for U.S. Appl. No. 10/773,092, filed Feb. 4, 2004.

Final Office Action mailed Feb. 2, 2011, for U.S. Appl. No. 12/613,457, filed Nov. 5, 2009.

Final Office Action mailed Feb. 16, 2011, for U.S. Appl. No. 12/543,405, filed Aug. 18, 2009.
Final Office Action mailed Jan. 5, 2011, for U.S. Appl. No. 12/611,387, filed Nov. 3, 2009.
Final Office Action mailed Mar. 24, 2010, for U.S. Appl. No. 11/462,035, filed Aug. 2, 2006.
Final Office Action mailed Nov. 9, 2010, for U.S. Appl. No. 11/462,035, filed Aug. 2, 2006.
Final Office Action mailed Nov. 20, 2009, for U.S. Appl. No. 12/192,897, filed Aug. 15, 2008.
Final Office Action mailed Sep. 1, 2009, for U.S. Appl. No. 11/841,855, filed Aug. 20, 2007.
Gaubatz, Matthew et al., "Automatic Red-Eye Detection and Correction", IEEE ICIP, Proceedings 2002 International Conference on Image Processing, 2002, pp. 1-804-1-807, vol. 2—Issue 3.
Han, T. et al., "Detection and Correction of abnormal Pixels in Hyperion Images", IEEE International Symposium on Geoscience and Remote Sensing, 2002, pp. 1327-1330, vol. 3.
Iivarinen, J. et al., "Content-Based Retrieval of Defect Images, http://www.cs.tut.fi/.about.avisa/digger/Publications/acivs02.pdf", Proceedings of Advanced Concepts for Intelligent Vision, Laboratory of Computer Information Science, 2002.
Ioffe, S., "Red eye detection with machine learning", Proceedings 2003 International Conference on Image Processing, 2003, pp. 871-874, vol. 2—Issue 3.
Ito, M., "An Automated System for LSI Fine Pattern Inspection Based on Comparison of Sem Images and Cad Data", IEEE International Conference on Robotics and Automation, 1995, pp. 544-549, vol. 1.
Jin, B. et al., "Modeling and Analysis of Soft-Test/Repair for CCD-Based Digital X-Ray Systems", Instrumentation and Measurement, IEEE Transactions, 2003, pp. 1713-1721, vol. 52—Issue 6.
Nguyen, Karlene et al., "Differences in the Infrared Bright Pupil Response of Human Eyes", Proceedings of the 2002 symposium on Eye tracking research & applications, 2002, pp. 133-138.
Non-Final Office Action mailed Apr. 28, 2011, for U.S. Appl. No. 11/936,085, filed Nov. 7, 2007.
Non-Final Office Action mailed Apr. 28, 2011, for U.S. Appl. No. 11/937,377, filed Nov. 8, 2007.
Non-Final Office Action mailed Aug. 30, 2010, for U.S. Appl. No. 11/841,855, filed Aug. 20, 2007.
Non-Final Office Action mailed Aug. 31, 2009, for U.S. Appl. No. 11/462,035, filed Aug. 2, 2006.
Non-Final Office Action mailed Aug. 5, 2010, for U.S. Appl. No. 11/462,035, filed Aug. 2, 2006.
Non-Final Office Action mailed Jul. 14, 2009, for U.S. Appl. No. 12/192,897, filed Aug. 15, 2008.
Non-Final Office Action mailed Mar. 31, 2011, for U.S. Appl. No. 12/551,312, filed Aug. 31, 2009.
Non-Final Office Action mailed May 2, 2011, for U.S. Appl. No. 12/824,214, filed Jun. 27, 2010.
Non-Final Office Action mailed May 3, 2010, for U.S. Appl. No. 12/187,763 filed Aug. 7, 2008.
Non-Final Office Action mailed May 4, 2010, for U.S. Appl. No. 12/192,335, filed Aug. 15, 2008.
Non-Final Office Action mailed Nov. 30, 2010, for U.S. Appl. No. 11/861,257, filed Sep. 25, 2007.
Non-Final Office Action mailed Oct. 5, 2009, for U.S. Appl. No. 10/919,226, filed Aug. 16, 2004.
Non-Final Office Action mailed Oct. 7, 2009, for U.S. Appl. No. 12/119,614, filed May 13, 2008.
Non-Final Office Action mailed Oct. 29, 2009, for U.S. Appl. No. 12/194,148, filed Aug. 19, 2008.
Non-Final Office Action mailed Sep. 17, 2010, for U.S. Appl. No. 11/690,834, filed Mar. 25, 2007.
Non-Final Office Action mailed Sep. 21, 2010, for U.S. Appl. No. 10/773,092, filed Feb. 4, 2004.
Notice of Allowance mailed Dec. 10, 2010, for U.S. Appl. No. 11/462,035, filed Aug. 2, 2006.
Notice of Allowance mailed Feb. 1, 2010, for U.S. Appl. No. 10/919,226, filed Aug. 16, 2004.
Notice of Allowance mailed Feb. 4, 2011, for U.S. Appl. No. 12/611,387, filed Nov. 3, 2009.
Notice of Allowance mailed Feb. 19, 2010, for U.S. Appl. No. 12/119,614, filed May 13, 2008.
Notice of Allowance mailed Feb. 19, 2010, for U.S. Appl. No. 12/194,148, filed Aug. 19, 2008.
Notice of Allowance mailed Jun. 27, 2010, for U.S. Appl. No. 12/192,897, filed Aug. 15, 2008.
Notice of Allowance mailed Mar. 3, 2011, for U.S. Appl. No. 12/543,405, filed Aug. 18, 2009.
Notice of Allowance mailed Mar. 17, 2011, for U.S. Appl. No. 12/042,335, filed Mar. 5, 2008.
Notice of Allowance mailed May 12, 2011, for U.S. Appl. No. 12/043,025, filed Mar. 5, 2008.
Notice of Allowance mailed May 18, 2011, for U.S. Appl. No. 12/707,531, filed Feb. 17, 2010.
Notice of Allowance mailed Nov. 18, 2009, for U.S. Appl. No. 11/282,954, filed Nov. 18, 2005.
Notice of Allowance mailed Oct. 15, 2010, for U.S. Appl. No. 11/554,539, filed Oct. 30, 2006.
Notice of Allowance mailed Oct. 22, 2010, for U.S. Appl. No. 12/187,763, filed Aug. 7, 2008.
Notice of Allowance mailed Oct. 28, 2010, for U.S. Appl. No. 12/192,335, filed Aug. 15, 2008.
Notice of Allowance mailed Oct. 28, 2010, for U.S. Appl. No. 11/690,834, filed Mar. 25, 2007.
Patent Abstracts of Japan, publication No. 2000050062, Image Input Device, application No. 10-217124, published Feb. 18, 2000, 1 page.
PCT International Preliminary Report on Patentability for PCT Application No. PCT/EP2005/005907, dated Nov. 15, 2006, 8 pages.
PCT International Preliminary Report on Patentability for PCT Application PCT/EP2004/008706, dated Feb. 6, 2006, 7 pages.
PCT International Preliminary Report on Patentability for PCT Application PCT/EP2004/010199, dated Apr. 3, 2006, 7 pages.
PCT International Preliminary Report on Patentability (IPRP) for PCT Application PCT/EP2005/011010, dated Jan. 23, 2007, 18 pages.
PCT International Search Report and Written Opinion of the International Searching Authority for PCT Application No. PCT/EP2004/008706, dated Nov. 19, 2004, 13 pages.
PCT Notification Concerning Transmittal of International Preliminary Report on Patentability, for PCT Application No. PCT/US2007/062090, dated Aug. 28, 2008, 6 pages.
PCT Notification of Transmittal of the International Search Report and the Written Opinion of the International Searching Authority, or the Declaration, for PCT Application No. PCT/EP2006/008358, Dec. 5, 2006, 14 pages.
PCT Notification of Transmittal of the International Search Report and the Written Opinion of the International Searching Authority, or the Declaration, for PCT Application No. PCT/EP2009/005809, dated Nov. 24, 2009, 12 pages.
PCT Notification of Transmittal of the International Search Report and the Written Opinion of the International Searching Authority, or the Declaration, for PCT Application No. PCT/EP2009/006361, dated Nov. 11, 2009, 10 pages.
PCT Notification of Transmittal of the International Search Report and the Written Opinion of the International Searching Authority, or the Declaration for PCT Application No. PCT/US07/62090 issued Mar. 10, 2008, 10 pages.
PCT Notification of Transmittal of the International Search Report and the Written Opinion of the International Searching Authority, or the Declaration, for PCT Application No. PCT/US2008/055964, paper dated Jul. 30, 2008, 8 Pages.
PCT Notification of Transmittal of the International Search Report and the Written Opinion of the International Searching Authority, or the Declaration for PCT/EP/2005/011010, dated Jan. 23, 2006, 14 pages.
PCT Notification of Transmittal of the International Search Report and the Written Opinion of the International Searching Authority, or the Declaration for PCT/EP/2005/05907, dated Aug. 1, 2005, 12 pages.
PCT Notification of Transmittal of the International Search Report and the Written Opinion of the International Searching Authority, or the Declaration, for PCT/EP2004/010199, paper dated Dec. 13, 2004, 13 pages.

PCT Notification of Transmittal of the International Search Report and the Written Opinion of the International Searching Authority, or the Declaration (PCT/EP2006/008342), dated Dec. 28, 2006.

PCT Notification of Transmittal of the International Search Report and Written Opinion of the International Searching Authority for PCT Application No. PCT/EP2005/001171, dated Jan. 27, 2006, 11 pages.

PCT Partial International Search Report for Application No. PCT/EP2009/051081, dated Apr. 29, 2009, 7 pages.

Plotnikov, Yuri et al., Advanced Image Processing for Defect Visualization in Infrared Thermography, NASA Langley Research Center, M.S. Posted: ACM Portal, 1998, http://citeseer.ist.psu.edu/plotnikov98advanced.html.

Plotnikov, Yuri et al., Winfree, "Visualization of Subsurface Defects in Composites Using a Focal Plane Array Infrared Camera, http://citeseer.ist.psu.edu/357066.html", NASA Langley Research Center, 1999.

Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.

Shen, Jianhong, "Inpainting and the Fundamental Problem of Image Processing", 2002, 6 pages.

Smolka, B. et al., "Towards Automatic Redeye Effect Removal, XP004416063", Pattern Recognition Letters, 2003, pp. 1767-1785, vol. 24—Issue 11, North-Holland Publ.

Soriano, M. et al., "Making Saturated Facial Images Useful Again, XP002325961, ISSN: 0277-786X", Proceedings of the SPIE, 1999, pp. 113-121, vol. 3826.

Tan, Yap-Peng et al., "Robust Sequential Approach for the Detection of Defective Pixels in an Image Sensor, ", IEEE International Conference on Acoustics, Speech, and Signal Processing, 1999, pp. 2239-2242, vol. 4, http:// ieeexplorejeee.org/search/freesrchabstract. jsp?arnumber=758382&isnumber=16342&punumber=6110& k2dock ey=758382©ieeecnfs& query=%28%28%28%28images+and+defects+and+correction% 29%29%29%29+%3Cin%3E.

Tatsutoshi Kitajima (JP04-192681 English Translation; Electronic Camera, Jul. 10, 1992).

Toet, A., Multiscale Color Image Enhancement, International Conference on Image Processing and its Applications, 1992, pp. 583-585, Posted online: 200208-06 18:09:24.0 http://ieeexplore.ieee.org/search/freesrchabstract.jsp? arnumber=146865&isnumber= 3917& punumber=1197&k2dockey =146865©ieeecnfs& query=%28%28images+and + defects+and+luminance%29%29+%3Cin%3E+metadata&pos=1.

Translation of Hiroshi et al. JP05-224271, Mar. 1993, Japan Publication.

United Kingdom Search Report dated May 22, 2007, issued in Application No. GB 0701957.3.

U.S. Appl. No. 10/170,511, filed Jun. 12, 2002, inventor Michael J. DeLuca.

U.S. Appl. No. 10/772,767, filed Feb. 4, 2004, by inventors Michael J. DeLuca, et al.

U.S. Appl. No. 11/217,788, filed Aug. 30, 2005, inventors Eran Steinberg, et al.

Vachier, et al.,"Valuation of Image Extrema Using Alternating Filters by Reconstruction" , Proceedings of the SPIE—The International Society for Optical Engineering , 1995, 2568, 94-103.

Viola Paul, et al., "Robust Real-time Object Detection", Second International Workshop on Statistical and Computation Theories of Vision—Modeling, Learning, Computing, and Sampling, Vancouver, Canada, Jul. 13, 2001, 25 Pages.

Willamowski, J. et al., "Probabilistic Automatic Red Eye Detection and Correction", The 18th International Conference on Pattern Recognition (ICPR'06), 2006, pp. 762-765, vol. 3, IEEE Computer Society.

Non-Final Rejection, dated Dec. 14, 2011, for U.S. Appl. No. 12/362,399, filed Jan. 29, 2009.

PCT International Preliminary Report on Patentability, Chapter I (IB/373), for PCT Application No. PCT/EP2004/008706, report dated Feb. 6, 2006, 7 Pages.

PCT Written Opinion of the International Search Authority, for PCT Application No. PCT/EP2004/008706, report dated Feb. 6, 2006, 6 Pages.

Patent Abstract of Japan, for Japanese Patent Application Laid-Open No. Hei 05-224271. Date of Publication: Sep. 3, 1993, for Image Processor.

Patent Abstract of Japan, for Japanese Patent Application Laid-Open No. 2006-285956. Date of Publication: Oct. 19, 2006, for Red Eye Detecting Method and Device, and Program.

Patent Abstracts of Japan, for Japanese Patent Application Laid-Open No. 2002-247596. Date of Publication: Aug. 30, 2002, for Program for Specifying Red Eye Area in Image, Image Processor and Recording Medium.

Patent Abstract of Japan, for Japanese Patent Application Laid-Open No. 2000-125320. Date of Publication: Apr. 28, 2000, for Computer Program Product for Detecting Pink Eyes.

Patent Abstracts of Japan, for Japanese Patent Application Laid-Open No. 2004-242141. Date of Publication: Aug. 24, 2004, for Color Defective Area Correction Method, Color Defective Area Correction Processing Program, and Image Processing Apparatus.

Patent Abstracts of Japan, for Japanese Patent Application Laid-Open No. 2005-196385. Date of Publication: Jul. 21, 2005, for Image Processing Apparatus, Image Processing Method and Digital Camera.

English language translation is JP 11-284874 A. Date of Publication: Oct. 15, 1999, for Automatic Red-Eye Detection and Reduction.

PCT International Preliminary Report on Patentability, for PCT application No. PCT/US2008/055964, report dated Aug. 9, 2009, 6 pages.

PCT Written Opinion of the International Searching Authority, for PCT application No. PCT/US2008/055964, report dated Jul. 30, 2008, 5 pages.

* cited by examiner

RED EYE FALSE POSITIVE FILTERING USING FACE LOCATION AND ORIENTATION

PRIORITY

This application is a Continuation of U.S. patent application Ser. No. 12/043,025, filed Mar. 5, 2008, now U.S. Pat. No. 7,995,804; which claims the benefit of priority to U.S. provisional patent application No. 60/892,882, filed Mar. 5, 2007, which is incorporated by reference.

BACKGROUND

Redeye is the appearance of an unnatural reddish coloration of the pupils of a person appearing in an image captured by a camera with flash illumination. Redeye is caused by light from the flash reflecting off blood vessels in the person's retina and returning to the camera.

A large number of image processing techniques have been proposed to detect and correct redeye in color images. In general, these techniques typically are semi-automatic or automatic. Semi-automatic redeye detection techniques rely on human input. For example, in some semi-automatic redeye reduction systems, a user manually identifies to the system the areas of an image containing redeye before the defects are corrected.

Many automatic redeye reduction systems rely on a preliminary face detection step before redeye areas are detected. A common automatic approach involves detecting faces in an image and, subsequently, detecting eyes within each detected face. After the eyes are located, redeye is identified based on shape, coloration, and brightness of image areas corresponding to the detected eye locations. In general, face-detection-based automatic redeye reduction techniques have high computation and memory resource requirements. In addition, most of the face detection algorithms are only able to detect faces that are oriented in an upright frontal view; these approaches cannot detect faces that are rotated in-plane or out-of-plane with respect to the image plane.

U.S. Pat. No. 6,407,777 to DeLuca discloses in-camera detection and correction of redeye pixels in an acquired digital image. U.S. Pat. No. 6,873,743 to Steinberg discloses automated real-time detection and correction of redeye defects optimized for handheld devices. US published patent applications 2005/0047655 and 2005/0047656 to Luo et al. disclose detecting and correcting redeye in a digital image and in embedded systems, respectively.

Automatic red eye detection algorithms can sometimes wrongly identify an image region as red eye artefact. Those regions are called False Positives (FP). Although somewhat rare, applying red eye correction to them can result in a visually displeasing image. It is desired to have a technique that reduces the number of false positives by using face location and/or orientation information.

SUMMARY OF THE INVENTION

A method of detecting and correcting a red-eye defect within a digital image is provided. An image is acquired having one or more non red eye defect regions which are red in color. A first stage initial segmentation of candidate redeye regions is performed to determine a first set of one or more confirmed redeye regions designated for correction. A location and orientation of any faces within the image are determined. The first set of confirmed redeye regions is analyzed based on the determined location and orientation of faces to determine a probability that each confirmed redeye region appears at a position of an eye. Any confirmed redeye regions having at least a certain threshold probability of being a false positive are removed from the first set, and a second set is generated. The second set of confirmed red eye regions is corrected and a red eye corrected image is generated which has the second set of confirmed red eye regions corrected therein. The redeye corrected image is electronically stored, transmitted, further processed or edited, or displayed, or combinations thereof.

The performing of the first stage initial segmentation of red eye regions may include pixel analyzing. The performing of the first stage initial segmentation of red eye regions may include falsing and verification filtering. The analyzing and removing may be performed prior to any correcting of the image. The first set of confirmed redeye regions may be initially corrected, and an initial corrected image may be generated prior to the analyzing and removing and the generating of the red eye corrected image. One or more detected faces may include at least one red eye defect such that the second set comprises a non-empty set, or the second set may be empty such that no actual redeye regions are corrected in the image.

An embedded image acquisition and processing system includes an image acquisition subsystem. A red eye filter performs in a first stage an initial segmentation of candidate redeye regions detected within an acquired image to determine a first set of one or more confirmed redeye regions designated for correction. A face location and orientation detector and an analysis filter determine a probability that each confirmed redeye region appears at a position of an eye based on determining face location and orientation information. A processor corrects any red eye defects of the confirmed red eye regions of the first set minus any having at least a certain threshold probability of being a false positive and generates a red eye corrected image. The red eye corrected image is electronically stored, transmitted, further processed or edited, or displayed, or combinations thereof. No redeye defects are corrected when no faces are detected within the image.

One or more storage devices having processor-readable code embodied therein are also provided for programming one or more processors to perform any of the methods described herein alone or in combination with techniques described in references incorporated herein.

BRIEF DESCRIPTION OF THE DRAWINGS

Statement Regarding Color Drawings

The patent or application file contains at least one drawing that is executed in color, including color photographs. Copies of this patent or patent application publication with color drawing(s) will be provided by the Office upon request and payment of the necessary fee.

DETAILED DESCRIPTION OF THE EMBODIMENTS

Figure 1A:
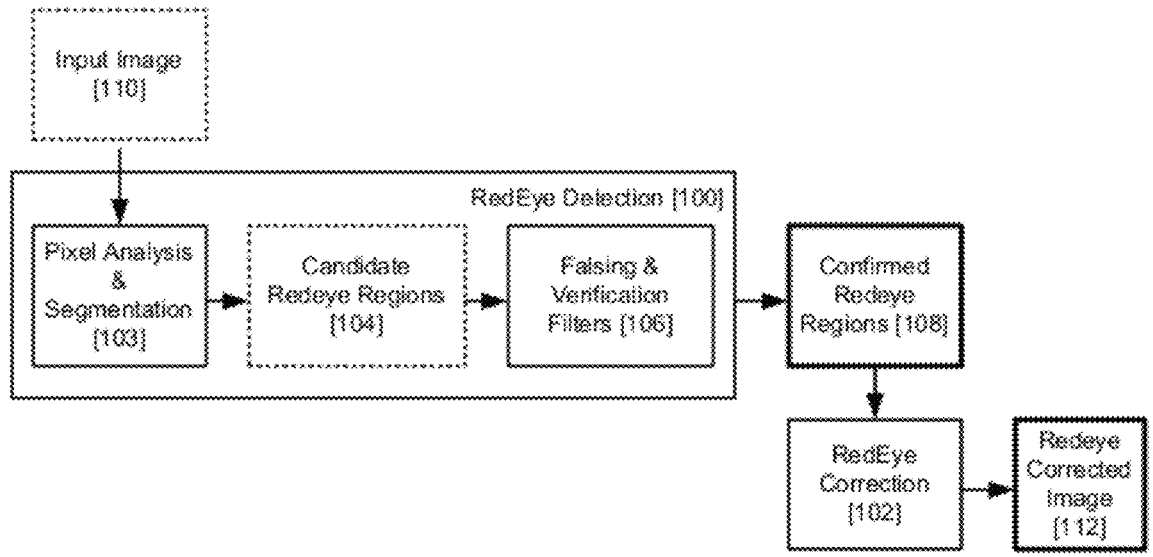
FIG. 1A is a block diagram illustrating a first red eye correction method.

A redeye filter process is illustrated in FIG. 1A. An input image is first analyzed by a redeye detection stage 100 at a pixel level 103 and segmented into candidate redeye regions 104. A further series of falsing and verification filters 106 are then applied to the candidate regions and a set of confirmed redeye regions 108 is thereby determined. A correction filter (pixel modifier) 102 is next applied to the confirmed regions and a final image 112, corrected for redeye, is generated.

In embodiments herein, a face detection algorithm is applied either as a component of an advantageous falsing and verification filter 106, or after the set of confirmed red eye regions is initially determined at 108. This face detection algorithm determines location and/or orientation of the face. This provides information as to where specifically that any eyes probably exist and/or where specifically that eyes probably do not exist within the image.

Figure 1B:
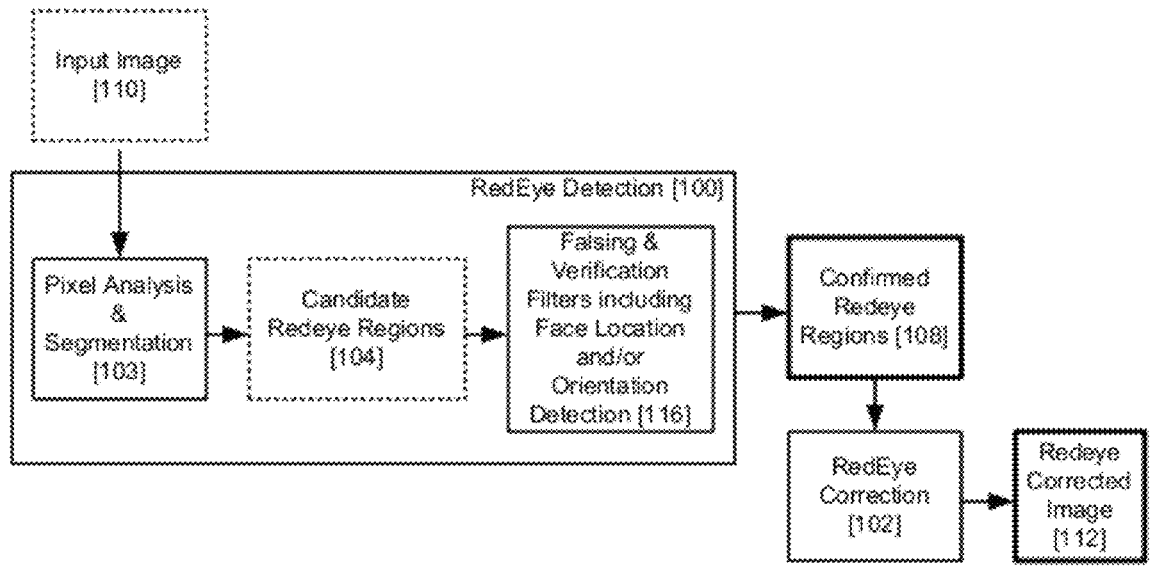
FIG. 1B is a block diagram illustrating a second red eye correction method.

FIG. 1B illustrates a process including analyzing an input image by a red eye detection stage 100 at a pixel level 103 and segmenting into candidate red eye regions 104, as well as applying falsing and verification filters 116 to the candidate regions for determining a confirmed set of red eye regions 108. In this embodiment, the falsing and verification filter 116 including a face detection process that determines location and/or orientation of the face that provides information as to where specifically that any eyes probably exist and/or where specifically that eyes probably do not exist within the image.

Figure 1C:
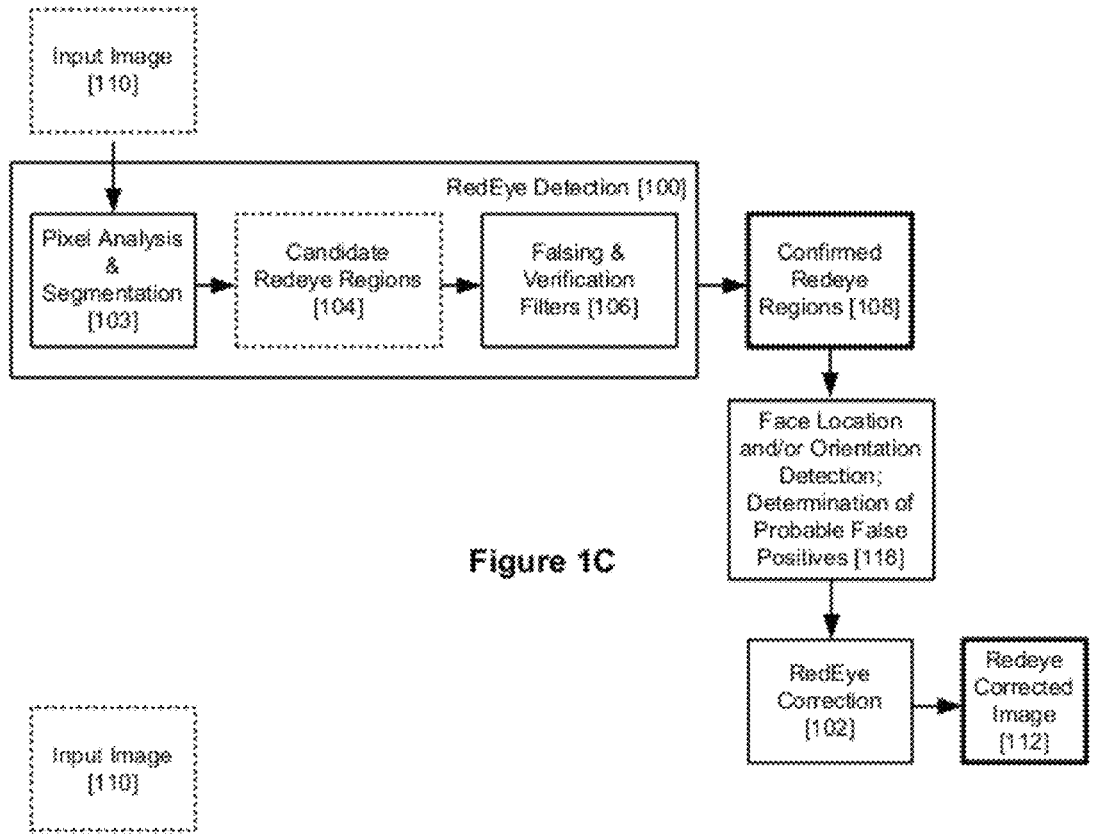
FIG. 1C is a block diagram illustrating a third red eye correction method.
Figure 1D:
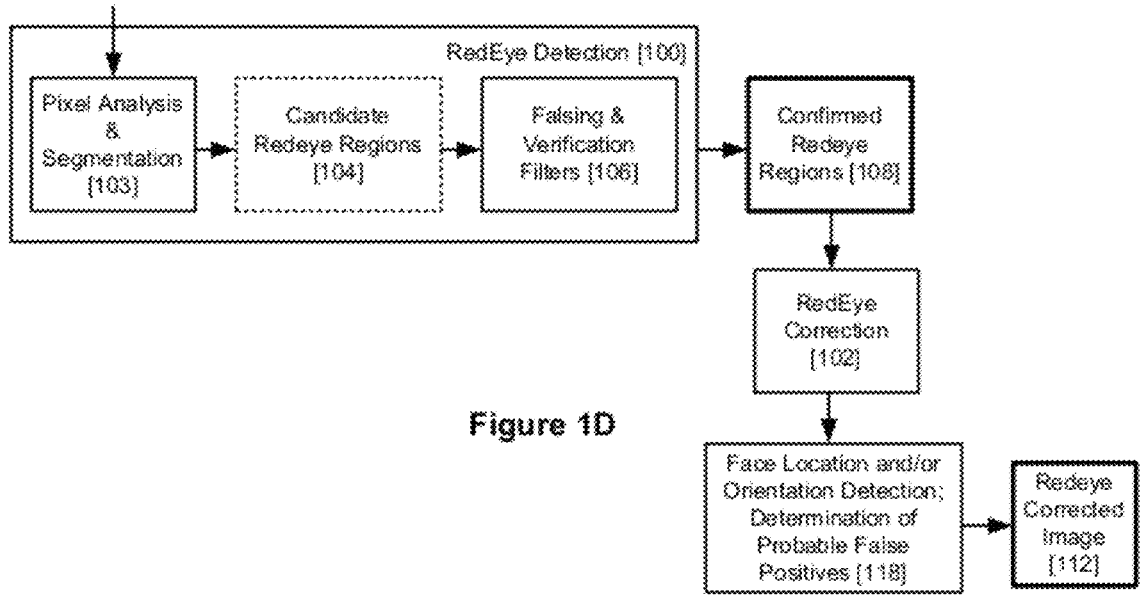
FIG. 1D is a block diagram illustrating a fourth red eye correction method.

FIG. 1C illustrates a process including analyzing an input image by a red eye detection stage 100 at a pixel level 103 and segmenting into candidate red eye regions 104, as well as applying falsing and verification filters 106 to the candidate regions for determining a confirmed set of red eye regions 108. In this embodiment, a face detection process 118 determines location and/or orientation of the face and provides information as to where specifically that any eyes probably exist and/or where specifically that eyes probably do not exist within the image. The face detection process 118 for determining false positives is performed upon confirmation of red eye regions at 108, whereas in FIG. 1D, the face detection process 118 for determining false positives is performed after confirmation of red eye regions 108 and also after correction of the confirmed red eye regions 102.

Figure 2A:
FIGS. 2A-2B is an image of a person including red eye defects and regions having red color that are not red eye defect regions.
Figure 2B:

Referring to FIGS. 2A-2B, a woman wearing red earrings is photographed and red eye artefact is present within the image in both of her eyes. The earrings that she is wearing are similar in color to the red color appearing as photographic artefact in her eyes. While conventional red eye correction algorithms would adjust the color of the eyes as well as the earrings, the present invention serves to distinguish the actual red eye artefact appearing in the woman's eyes from her red earrings. It does this by determining that the woman's eyes probably are at the location of the real red eye artefact based on determining the location and/or orientation of the woman's face, while also determining that the woman's earrings are at a location of a false positive, because the earrings are at respective locations within the digital image relative to her facial position and/or orientation that do not correspond to where her eyes would probably be, based on the determined location and/or orientation of her face.

Figure 3A:
FIGS. 3A-3B is the image of FIG. 2 with the red eye defects and the other regions corrected for color.
Figure 3B:

In the image provided at FIGS. 3A-3B, one can see that an initial red eye auto-detection algorithm correctly found the two actual red-eye regions and corrected them with regard to their color. However, the algorithm also mistakenly found the two earrings and further corrected each of them.

Figure 4A:
FIGS. 4A-4B illustrates the face of the person in FIGS. 2 and 3 being detected and located and having its orientation determined.
Figure 4B:

FIGS. 4A-4B illustrate the advantageous use of a face detection algorithm that determines location and orientation of the woman's face. The box shown in FIGS. 4A-4B encloses substantially the woman's face. The red side of the box indicates the top of her head indicating a determination of facial orientation. The algorithm figures this out based on location of features of the woman's face such as eyes, nose, mouth cheeks, chin, eyebrows, hairline, and/or other features of the woman's head or other body parts such as her neck, shoulders, torso and/or legs either appearing or not appearing in certain directions relative to the face within the digital image, and/or the shape of the head, and/or the appearance of ears, among other possible factors (see, e.g., US applications US2006/0204110, PCT/US2006/021393, US2002/0172419 to Lin et al; US2002/0126893 to Held et al US2005/0232490 to Itagaki et al. and US 2004/0037460 to Luo et al., each incorporated by reference).

In the example of FIGS. 4A-4B, one of the earrings is within the face detection box (i.e., the right earring), while the other earring is outside the face detection box (i.e., the left earring). The red left earring is deemed to have lower probability of being red eye artefact, because it is outside the box, than features such as the woman's eyes and the right earring, because these are inside the box. In addition, both of the woman's red earrings are located near sides of the box, while her eyes are detected within the box at a location that is more probably where her eyes would be than at the sides of the box. Thus, both earrings now have reduced probability of being red eye artefact than the woman's red eyes, possibly with the left earring having the lower probability of the two earrings. Using orientation detection, the red eye artefact within each of the woman's eyes is determined to be at a location that is probably where her eyes would be and thus are deemed to be red eye artefact to be corrected, while the red earrings are determined to be at a location that is probably not where her eyes would be and thus deemed not to be red eye artefact.

The red side of the box that indicates the "top" of the woman's head or face, or the "up" side of her face may be obtained by applying the face detection algorithm on the image as indicated, and also by using face tracking which uses multiple preview images or other reference images such as postview images or images captured simultaneously with the main image of FIGS. 2A-2B.

In the described example, the position of every detected red eye region is analyzed in respect to the face location. Two correct red eyes are found to be positioned inside the face region and in agreement with the orientation and are therefore considered red eye candidates. The left earring region is found to be inside the face box but, because of orientation mismatch, is classified as a false positive and filtered out. The right earring region is found to be outside the face box, but very close to the face regions. In this case it is considered that the likelihood of another face being present is minimal and therefore the region is classified as a false positive and removed. If a second face is detected within the image, then the red eye process can proceed with respect to that face, and any red eye artefact can be removed in that second process. Other possible red eye regions that are located far enough from the face are unaffected and therefore remain red eye candidates.

Figure 5A:
FIGS. 5A-5B is the image of FIG. 2 or FIG. 3 with only the actual red eye defects corrected.
Figure 5B:

FIGS. 5A-5B illustrate the corrected image of the woman having actual red eye artefact corrected and the false positive earrings returned to their initially captured red color. In the examples of FIGS. 2A-5B, the horns being worn by the woman, perhaps at some Holiday party, were not initially detected as red eye artefact. If they were initially deemed to be red eye artefact, then the same process as with the earrings would have identified these as false positives as well.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the appended claims, and structural and functional equivalents thereof.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited herein as well as the background, invention summary, abstract and brief description of the drawings, as well as U.S. Pat. Nos. 6,407,777, 7,315,631 and 7,336,821, and US published patent applications nos. 2005/0041121, 2005/0031224, 2005/0140801, 2006/0204110, 2006/0093212, 2006/0120599, 2007/0110305 and 2006/0140455, and PCT/EP2006/008358, and U.S. patent application Ser. Nos. 60/773,714, 60/804,546, 60/865,375, 60/865,622, 60/829,127, 60/829,127, 60/821,165, 60/892,882, 60/945,558, 60/915,669 10/772,767, 11/554,539, 11/464,083, 11/462,035, 11/282,954, 11/027,001, 10/842,244, 11/024,046, 11/233,513, 11/753,098, 11/753,397, 11/766,674, 11/769,206, 11/772,427 and 11/460,218, are all incorporated by reference into the detailed description of the preferred embodiments as disclosing alternative embodiments.

What is claimed is:

1. A method of detecting and correcting a red-eye defect within a digital image, comprising:
   acquiring an image including one or more non red eye defect regions having a red color;
   performing in a first stage an initial segmentation of candidate redeye regions to determine a first set of one or more confirmed redeye regions designated for correction;
   analyzing pixels in a vicinity of at least one of the one or more confirmed red eye regions of the first set;
   analyzing the first set of confirmed redeye regions based on the analyzing of said pixels in said vicinity of said at least one of said one or more confirmed red eye regions of said first set;
   removing from the first set any confirmed redeye regions having at least a certain threshold probability of being a false positive based on said analyzing of said first set of confirmed red eye regions, and thereby generating a second set;
   correcting the second set of confirmed red eye regions and generating a red eye corrected image which has the second set of confirmed red eye regions corrected therein; and
   electronically storing, transmitting, further processing or editing, or displaying the red eye corrected image, or combinations thereof,
   wherein the performing of the first stage initial segmentation of red eye regions comprises pixel analyzing, and
   wherein the method further comprises falsing and verification filtering.

2. The method of claim 1, wherein the performing of the first stage initial segmentation of red eye regions comprises said falsing and verification filtering.

3. The method of claim 1, wherein the analyzing and removing are performed prior to any correcting of the image.

4. The method of claim 1, further comprising initially correcting the first set of confirmed redeye regions and generating an initial corrected image prior to the analyzing and removing and the generating of said red eye corrected image.

5. The method of claim 1, wherein the one or more faces further include at least one red eye defect such that the second set comprises a non-empty set.

6. The method of claim 1, wherein the second set comprises an empty set such that no actual redeye regions are corrected in the image.

7. An embedded image acquisition and processing system, comprising,
   (a) an image acquisition subsystem;
   (b) a red eye filter that performs in a first stage an initial segmentation of candidate redeye regions detected within an acquired image to determine a first set of one or more confirmed redeye regions designated for correction;
   (c) a pixel analyzer configured to analyze pixels in a vicinity of at least one of the one or more confirmed red eye regions of the first set;
   (d) an analysis filter that determines a probability that each confirmed redeye region appears at a position of an eye based on results of applying the pixel analyzer to the at least one of the one or more confirmed red eye regions of the first set;
   (e) a processor for correcting the red eye defects of the confirmed red eye regions of the first set minus any having at least a certain threshold probability of being a false positive based on said results of applying said pixel analyzer and generating a red eye corrected image; and
   (f) wherein the red eye corrected image is electronically stored, transmitted, further processed or edited, or displayed, or combinations thereof;
   (g) wherein the performing of the first stage initial segmentation of red eye regions comprises pixel analyzing, and
   (h) wherein the method further comprises falsing and verification filtering.

8. The system of claim 7, wherein the performing of the first stage initial segmentation of red eye regions comprises said falsing and verification filtering.

9. The system of claim 7, wherein the analyzing and removing are performed prior to any correcting of the image.

10. The system of claim 7, wherein the processor further for initially correcting the first set of confirmed redeye regions and generating an initial corrected image prior to the analyzing and removing and the generating of said red eye corrected image.

11. The system of claim 7, wherein the system is configured such that no redeye defects are corrected when no faces are detected within the image.

12. One or more storage devices having processor-readable code embodied therein for programming one or more processors to perform a method of detecting and correcting a red-eye defect within an acquired digital image that includes one or more non red eye defect regions having a red color, the method comprising:

performing in a first stage an initial segmentation of candidate redeye regions to determine a first set of one or more confirmed redeye regions designated for correction;

analyzing pixels in a vicinity of at least one of the one or more confirmed red eye regions of the first set;

analyzing the first set of confirmed redeye regions based on the analyzing of said pixels in said vicinity of said at least one of said one or more confirmed red eye regions of said first set;

removing from the first set any confirmed redeye regions having at least a certain threshold probability of being a false positive based on said analyzing of said first set of confirmed red eye regions, and thereby generating a second set;

correcting the second set of confirmed red eye regions and generating a red eye corrected image which has the second set of confirmed red eye regions corrected therein; and electronically storing, transmitting, further processing or editing, or displaying the red eye corrected image, or combinations thereof, and wherein the performing of the first stage initial segmentation of red eye regions comprises pixel analyzing, and wherein the method further comprises falsing and verification filtering.

13. The one or more storage devices of claim 12, wherein the performing of the first stage initial segmentation of red eye regions comprises said falsing and verification filtering.

14. The one or more storage devices of claim 12, wherein the analyzing and removing are performed prior to any correcting of the image.

15. The one or more storage devices of claim 12, further comprising initially correcting the first set of confirmed redeye regions and generating an initial corrected image prior to the analyzing and removing and the generating of said red eye corrected image.

16. The one or more storage devices of claim 12, wherein the one or more faces further include at least one red eye defect such that the second set comprises a non-empty set.

17. The one or more storage devices of claim 12, wherein the second set comprises an empty set such that no actual redeye regions are corrected in the image.

* * * * *